(12) United States Patent
Ur et al.

(10) Patent No.: US 11,743,346 B2
(45) Date of Patent: Aug. 29, 2023

(54) DETECTION DEVICE, DETECTION METHOD, AND DETECTION PROGRAM

(71) Applicant: NIPPON TELEGRAPH AND TELEPHONE CORPORATION, Tokyo (JP)

(72) Inventors: Shmuel Ur, Shorashim (IL); David Ash, Kirkland, WA (US); Vlad Dabija, Mountain View, CA (US)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 22 days.

(21) Appl. No.: 17/370,809

(22) Filed: Jul. 8, 2021

(65) Prior Publication Data
US 2023/0011236 A1    Jan. 12, 2023

(51) Int. Cl.
G06F 15/16 (2006.01)
H04L 67/306 (2022.01)
H04L 9/40 (2022.01)
G06N 20/00 (2019.01)

(52) U.S. Cl.
CPC ........... *H04L 67/306* (2013.01); *G06N 20/00* (2019.01); *H04L 63/1416* (2013.01); *H04L 63/1425* (2013.01)

(58) Field of Classification Search
CPC .............. H04L 67/306; H04L 63/1416; H04L 63/1425; G06N 20/00
USPC ................................. 709/203, 223
See application file for complete search history.

(56) References Cited

U.S. PATENT DOCUMENTS

| | | | | |
|---|---|---|---|---|
| 7,743,420 | B2* | 6/2010 | Shulman | G06F 21/577 726/25 |
| 8,244,532 | B1* | 8/2012 | Begeja | H04L 63/102 379/189 |
| 8,443,441 | B2* | 5/2013 | Stolfo | H04L 63/145 709/206 |
| 9,392,001 | B2 | 7/2016 | Wang et al. | |
| 10,262,153 | B2* | 4/2019 | Ford | G06F 21/84 |
| 10,419,469 | B1* | 9/2019 | Singh | H04L 67/535 |
| 10,698,989 | B2* | 6/2020 | Giobbi | G07C 9/257 |
| 10,986,114 | B1* | 4/2021 | Singh | G06F 9/545 |
| 11,157,571 | B2* | 10/2021 | Cardinal | H04L 67/53 |
| 11,411,980 | B2* | 8/2022 | Triantafillos | H04L 67/535 |
| 2005/0120054 | A1* | 6/2005 | Shulman | G06F 21/577 |
| 2010/0151817 | A1* | 6/2010 | Lidstrom | H04L 67/535 455/466 |

(Continued)

FOREIGN PATENT DOCUMENTS

WO    2016/044359 A1    3/2016

*Primary Examiner* — Anthony Mejia

(57) ABSTRACT

A detection device monitors a communication event including communication by humans when a legitimate user accesses sensitive data for each legitimate user. The detection device builds a profile of the user indicating normal behavior when the user accesses the sensitive data by performing machine learning on a result of the monitoring. After that, the detection device acquires a communication event when a user to be authenticated accesses sensitive data. The detection device determines whether behavior of the user to be authenticated indicated in the acquired communication event corresponds to normal behavior when the user accesses the sensitive data indicated in a profile of the user, and outputs a result of the determination.

10 Claims, 2 Drawing Sheets

(56) References Cited

U.S. PATENT DOCUMENTS

| | | | |
|---|---|---|---|
| 2010/0251377 A1* | 9/2010 | Shulman | H04L 41/16 |
| | | | 726/25 |
| 2016/0014137 A1* | 1/2016 | Begeja | H04W 4/14 |
| | | | 726/4 |
| 2017/0324762 A1* | 11/2017 | Chow | H04L 69/22 |
| 2019/0236249 A1* | 8/2019 | Pavlou | G06F 21/554 |
| 2019/0334903 A1* | 10/2019 | Lerner | H04L 63/10 |
| 2019/0370610 A1* | 12/2019 | Batoukov | G06F 11/0793 |
| 2020/0267182 A1* | 8/2020 | Highnam | H04L 63/0236 |
| 2021/0067531 A1* | 3/2021 | Meir | G06F 21/552 |
| 2021/0168161 A1* | 6/2021 | Dunn | G06N 20/00 |
| 2021/0240836 A1* | 8/2021 | Hazony | G09B 5/00 |
| 2021/0334471 A1* | 10/2021 | Silverstein | G06F 40/30 |
| 2022/0232024 A1* | 7/2022 | Kapoor | G06F 16/9535 |
| 2022/0232025 A1* | 7/2022 | Kapoor | G06F 11/3438 |
| 2022/0343288 A1* | 10/2022 | Vadrevu | G06N 3/08 |

* cited by examiner

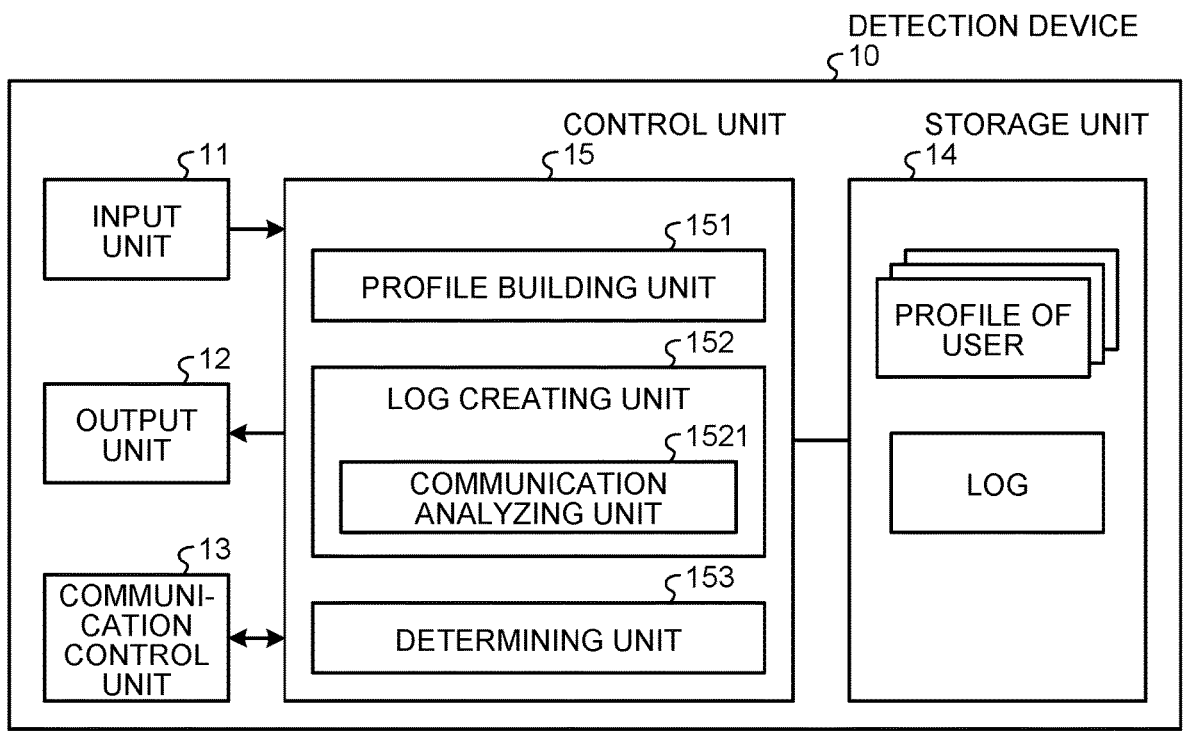
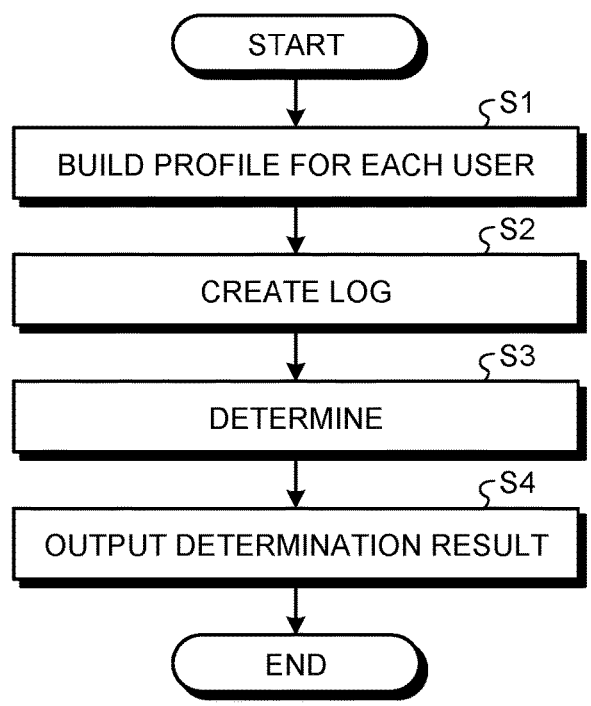

DETECTION DEVICE, DETECTION METHOD, AND DETECTION PROGRAM

BACKGROUND OF THE INVENTION

1. Field of the Invention

This invention relates to a detection device, a detection method, and a detection program.

2. Description of the Related Art

Conventionally, a detection system has checked logs of computers so as to find lateral movements and the like that are highly likely to be indication of attacks. Although attacks have not been found by checking logs, attacks may be made by social engineering. The social engineering is a technique for deceiving persons with psychological manipulation and making the persons disclose information. For example, for making persons give login credentials and the other sensitive and personal data in phishing attacks, there is a social engineering method for pretending reliable sources (deepfake and the like) and creating seemingly logical scenarios.

In this social engineering method, information necessary to access sensitive data is collected from many sources and interactions little by little. For this reason, a detection system needs to perform detection in consideration of social engineering trials on a plurality of sources.

However, a technique for performing attack detection in consideration of social engineering trials on a plurality of sources has not been developed in the past.

In view of the foregoing, an object of the present invention is to perform attack detection in consideration of social engineering trials on a plurality of sources.

SUMMARY OF THE INVENTION

It is an object of the present invention to at least partially solve the problems in the conventional technology. The present invention is a detection device comprising a processing circuit, the processing circuit being configured to monitor a communication event including communication by humans when a legitimate user accesses sensitive data for each legitimate user, and build a profile of the user indicating normal behavior when the user accesses the sensitive data by performing machine learning on a result of the monitoring, acquire a communication event when a user to be authenticated accesses sensitive data, determine whether behavior of the user to be authenticated indicated in the communication event corresponds to normal behavior when the user accesses the sensitive data indicated in a profile of the user, and output a result of the determination.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram illustrating the schematic configuration of a detection device of the present embodiment;

FIG. 2 is a flowchart illustrating an example of detection processing procedures.

DETAILED DESCRIPTION OF THE PREFERRED EMBODIMENT

Figure 3:
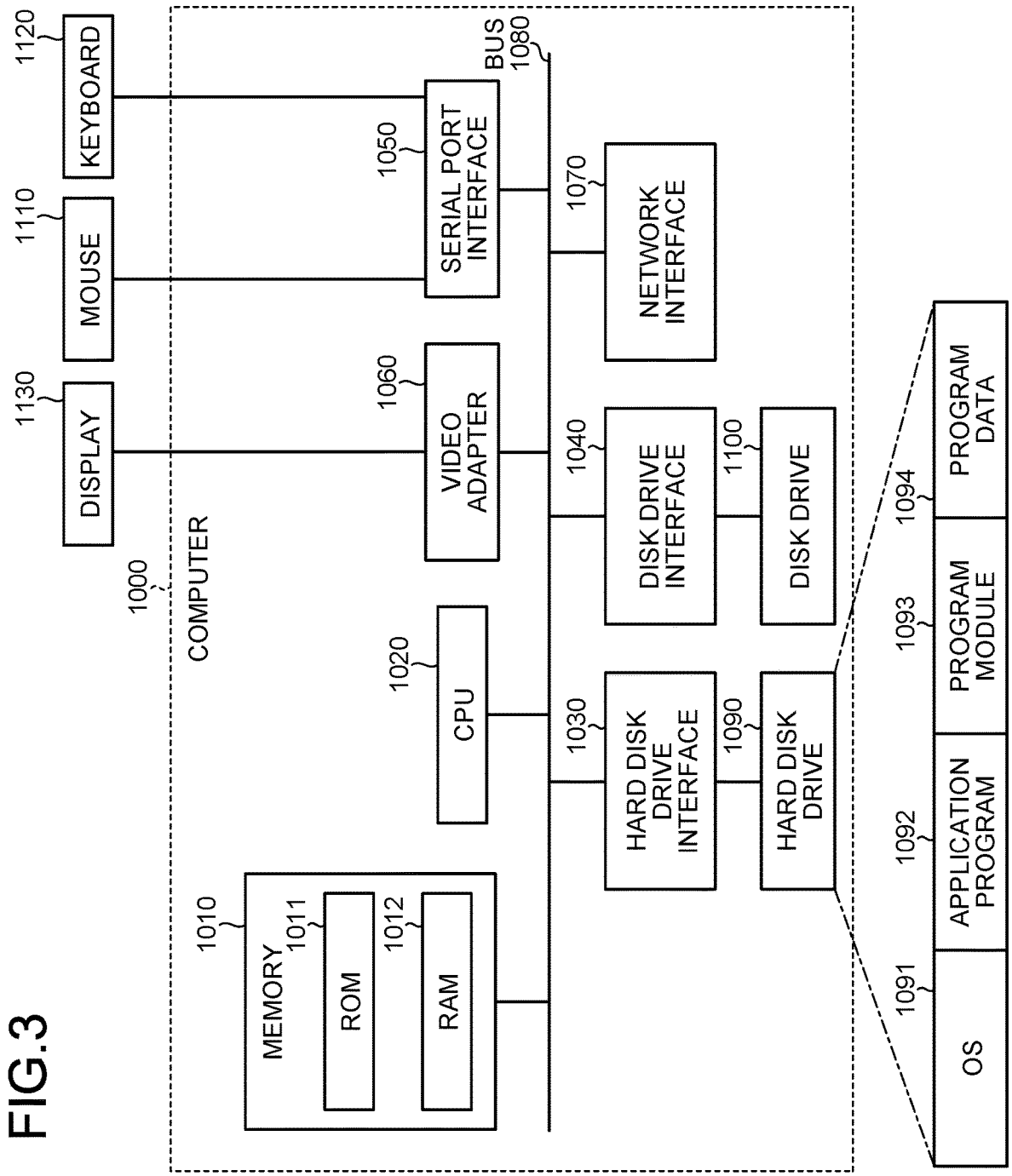
FIG. 3 is a diagram illustrating an example of a computer that executes a detection program.

A preferred embodiment of a detection device according to this invention will be described in detail with reference to the accompanying drawings. It should be noted that this embodiment is not intended to limit this invention. In the description of the drawings, like numerals are given to like parts.

Embodiment

Configuration of Detection Device

FIG. 1 is a schematic diagram illustrating the schematic configuration of a detection device of the present embodiment. As illustrated in FIG. 1, a detection device 10 of the present embodiment is implemented by general-purpose computers such as a personal computer, and includes an input unit 11, an output unit 12, a communication control unit 13, a storage unit 14, and a control unit 15.

The input unit 11 is implemented using input devices such as a keyboard and a mouse, and inputs, in response to an input operation performed by an operator, various kinds of instruction information such as the start of processing with respect to the control unit 15. The output unit 12 is implemented by display devices such as a liquid crystal display and printing devices such as a printer, and the like. For example, the output unit 12 displays a result of detection processing, which will be described later.

The communication control unit 13 is implemented by network interface cards (NICs) and the like. The communication control unit 13 controls communication between an external device via telecommunication lines such as a local area network (LAN) and the Internet and the control unit 15. For example, the communication control unit 13 controls communication between a management device and the control unit 15.

The storage unit 14 is implemented by semiconductor memory devices such as a random access memory (RAM) and a flash memory or storage devices such as a hard disk and an optical disk. The storage unit 14 preliminarily stores therein a processing program for operating the detection device 10, data used during execution of the processing program, and the like, or temporarily stores them each time processing is performed. The storage unit 14 stores therein, for example, a profile for each user built by the control unit 15, and logs. The storage unit 14 may communicate with the control unit 15 via the communication control unit 13.

The control unit 15 is implemented using a central processing unit (CPU), a network processor (NP), a field programmable gate array (FPGA), and the like, and executes a processing program stored in a memory. In this manner, the control unit 15 functions as a profile building unit 151, a log creating unit 152, and a determining unit 153 as illustrated in FIG. 1. Each of or a part of these function units may be mounted on different hardware. For example, the profile building unit 151 may be mounted on a device different from a device on which the log creating unit 152 and the determining unit 153 are mounted. The control unit 15 may include any other function units.

The profile building unit 151 builds a profile indicating normal behavior when a user accesses sensitive data for each user.

For example, the profile building unit 151 acquires a log of a communication event including communication by humans when a legitimate user accesses sensitive data. For example, the profile building unit 151 acquires a log of a communication event of a legitimate user that is created by the log creating unit 152, which will be described later. The profile building unit 151 performs machine learning using the acquired log of the communication event of the legitimate user so as to build a profile indicating normal behavior when the legitimate user accesses sensitive data.

A profile for each user includes dimensions indicated in the following (1) to (3).

(1) Access of an ordinary user to sensitive data and possibility of requiring the sensitive data The profile building unit 151 learns, for example, by unsupervised machine learning, an allowable sensitive data request with respect to a specific user. The profile building unit 151 may extend a profile of the specific user with other sensitive data and the like safely accessed by a similar user of the specific user.

(2) Skill used when a user usually accesses various kinds of sensitive data over a certain period of time (method by which the user usually accesses various kinds of sensitive data)

For example, by learning sensitive data requests from a user over a certain period of time, the profile building unit 151 performs machine learning about which access method (for example, electronic mails (e-mails) and phone calls) a user uses when the user usually accesses various kinds of sensitive data. Examples of methods for accessing various kinds of sensitive data include requests by server-based applications, web-based requests, and requests by mobile applications (advanced information technology (IT) monitoring system and the like) besides requests by e-mails and phone calls.

(3) Position when a user accesses various kinds of sensitive data

For example, the profile building unit 151 learns a position at which a user can access various kinds of sensitive data (for example, a network to which a terminal of a user belongs) for each user. In this manner, the profile building unit 151 learns, when a specific user usually accesses various kinds of sensitive data, from which position the specific user accesses the sensitive data. The position mentioned here may include, for example, not only a position in an office or outside the office but also a new access position in an office at which a user can access various kinds of sensitive data. In this manner, the particle size of a profile of a user can be made denser.

The profile that is built by the profile building unit 151 described above specifies kinds of sensitive data accessed by a user, skill used by a user when the user accesses various kinds of sensitive data, a position when a user accesses various kinds of sensitive data, and the like for each legitimate user.

The profile for each user may be extended using information when the other legitimate user accesses sensitive data.

For example, when acquiring kinds of sensitive data accessed by the other user and an access method used when the other user accesses sensitive data, the profile building unit 151 may form a cluster of a similar user and extend a profile of a user based on the formed cluster.

In this manner, when building a profile of a user, the profile building unit 151 can build the profile for improving discriminability of an event considered to be malignant.

The log creating unit 152 creates a log of a communication event (for example, kinds of sensitive data accessed by a user, an access method used when the user accesses the sensitive data, and a position of an access source when the user accesses the sensitive data) for each user. For example, the log creating unit 152 creates a log of a communication event of a user that is used for building a profile of the user. The log creating unit 152 also creates a log of a communication event of a user to be authenticated. The created log is stored in, for example, the storage unit 14.

The communication events described above include a communication event by humans besides a communication event by machines. The log creating unit 152 includes a communication analyzing unit 1521 that analyzes a communication event by humans. The communication analyzing unit 1521 analyzes a communication event by humans and creates a log of the communication event by humans described above. Examples of the communication event by humans include e-mails, phone calls, and communication by messages via a plurality of platforms. The communication event by humans includes interaction data between humans, but is not limited to this.

For example, the communication analyzing unit 1521 analyzes, using a plurality of communication channels such as e-mails, phone calls, and a plurality of platforms, contents of communication whenever a modification of permission conditions, a password, an answer to a secret question, and the like are requested, and creates a log indicating detailed contents of the communication.

For example, the communication analyzing unit 1521 analyzes contents of communication of the requests described above, and creates a log indicating who makes inquiries to whom, what contents of a request are, and the like.

The communication analyzing unit 1521 uses, for example, voice/text recognition and communication analysis of log events related to security for the analysis described above. For example, the communication analyzing unit 1521 uses natural language analysis, semantic analysis, voice analysis, and the like for the analysis described above.

The determining unit 153 determines whether behavior of a user to be authenticated that is indicated in a log of a communication event of the user deviates from normal behavior when the user accesses sensitive data (for example, kinds of the sensitive data of an access target, a method for accessing the sensitive data, and a position of an access source to the sensitive data) indicated in a profile of the user.

The analysis described above is similar to the analysis currently executed in a network and data access logs, but a log used for the determination includes interaction data between humans that is analyzed by the communication analyzing unit 1521 described above. In other terms, the determining unit 153 searches for an attack mode combining a human behavior log with a machine log.

For example, the determining unit 153 determines, based on a profile of a user built by the profile building unit 151, whether behavior of the user indicated in logs of network access and a data access event of the user corresponds to normal behavior of the user, or corresponds to an abnormal event. In the latter case, for example, the determining unit 153 determines possibility of a potential and malicious attack and gravity (including kinds of sensitive data to which access is attempted and the like), and issues a warning (preliminarily defined by a security manager) at a level depending on the determination.

For example, when determining that a skill level (including a method for accessing data and a position of an access source of the data) of a user indicated in a log of the user is suddenly changed based on a profile of the user, the determining unit 153 issues a warning. When determining that a sensitive level of the kind of sensitive data accessed by the user is higher than the level predicted from a profile of the user in addition to a sudden change in a skill level of the user, the determining unit 153 issues a stronger warning.

For example, when determining that a skill level of a user indicated in a log is, for example, a request by an e-mail or a phone call (such as an advanced system admin request by a temporary data user) and this skill level is different from the skill level indicated in a profile of the current user, the determining unit 153 issues a warning.

Furthermore, as another example, there is a case where a user makes inquiries about a password that the user forgot. In this case, the determining unit 153 compares a method used by a user for making inquiries about a password with a profile of the user so as to deduce possibility that the user is actually a legitimate user (deduction is easy in a case of e-mails, is difficult in a case of phone calls, and is more difficult in a case of video communication).

The determining unit 153 issues a warning of a different level about the other behavior deviated from a user cluster in a preliminarily built profile of a user.

The profile building unit 151 further characterizes behavior of a user using a log of the user in order to continue a training of a profile after building a profile of the user. In this manner, the profile building unit 151 can adapt a profile of the user to a change in skill and a change in behavior of the user.

This kind of the detection device 10 can directly correlate a social engineering trial with a network attack and evaluate possibility of a malignant event and a potential risk in real time.

Example of Processing Procedures

The following describes an example of processing procedures of the detection device 10 with reference to FIG. 2. The profile building unit 151 in the detection device 10 builds a profile for each user (S1). For example, the profile building unit 151 acquires a log of communication event for each user in a certain period of time that is created by the log creating unit 152. As described above, the log of this communication event includes a log of a communication event by humans besides a log of a communication event by machines. The profile building unit 151 performs machine learning of a log of a communication event for each user so as to build a profile indicating normal behavior when the user accesses sensitive data for each user.

Subsequently, the log creating unit 152 creates a log of a communication event when a user to be authenticated accesses sensitive data (S2: creation of a log). The log of this communication event includes a log of a communication event by humans besides a log of a communication event by machines.

Subsequently, the determining unit 153 determines whether behavior of a user to be authenticated indicated in a log created at S2 corresponds to behavior indicated in a profile of the user (S3). The determining unit 153 outputs a determination result at S3 (S4).

For example, when determining that behavior of a user to be authenticated does not correspond to behavior indicated in a profile of the user at S3, the determining unit 153 determines that the user to be authenticated is not a legitimate user (=an attack is detected). The determining unit 153 issues a warning. This kind of detection device 10 can detect attacks in consideration of social engineering trials with respect to a plurality of sources.

As far as we can see, unlike the detection device 10, there is no method for analyzing, based on a user skill and a model of sensitive data access (profile of a user), behavior of each user that accesses a computer network and contacts a company in search of network access authentication information for all of the communication channels between users and companies. The detection device 10 uses natural language analysis of communication by humans, semantic analysis, and voice analysis in addition to building a user skill and a model of sensitive data access. In this manner, the detection device 10 can detect and predict attacks with high accuracy and reduce the number of false detection.

For example, U.S. Pat. No. 9,392,001 discloses a method for detecting network intrusion and creating a honey user or a fake user attracting a malignant act and a fraudulent act so as to avoid intrusion. This method is extremely different from a method for detecting attacks performed by the detection device 10 described above, is extremely difficult, and has a low probability of success.

By contrast, a technique disclosed in PCT App WO2016044359A1 adopts an intrusion detection model using the number of counts calculated from security event history data. This technique is similar to the technique of the detection device 10 in that a model is built, but the intrusion detection model is based on only the number of counts. Thus, the intrusion detection model in this technique is not based on qualitative data such as semantic analysis of communication by humans performed by the detection device 10.

Lastly, U.S. Pat. No. 8,443,441 builds a model of the security policy of e-mails (only), and detects intrusion of the policy model. This technique is a contrast to the detection device 10 that builds a comprehensive model in interactions between a user and a computer network/a data source, and uses comprehensive analysis of all communication by humans with a network and a data access log in order to determine whether a specific event is a threat.

Computer Program

A computer program that describes processing executed by the detection device 10 according to the embodiment in a computer-executable language can be created. As one embodiment, the detection device 10 can be implemented by installing a detection program that executes the detection processing described above as packaged software and online software into a desired computer. For example, by causing an information-processing device to execute the detection program, the information-processing device can function as the detection device 10. The information-processing device mentioned here includes a desktop or a laptop personal computer. Besides, mobile communication terminals such as a smartphone, a mobile phone, and a personal handyphone system (PHS), slate terminals such as a personal digital assistant (PDA), and the like are in the category of the information-processing device. In addition, functions of the detection device 10 may be implemented in a cloud server.

FIG. 3 is a diagram illustrating an example of a computer that executes a detection program. A computer 1000 includes, for example, a memory 1010, a CPU 1020, a hard disk drive interface 1030, a disk drive interface 1040, a serial port interface 1050, a video adapter 1060, and a network interface 1070. Each of the units is connected to each other by a bus 1080.

The memory 1010 includes a read only memory (ROM) 1011 and a RAM 1012. The ROM 1011 stores therein, for example, a boot program of a basic input output system (BIOS) and the like. The hard disk drive interface 1030 is connected to a hard disk drive 1090. The disk drive interface 1040 is connected to a disk drive 1100. For example, attachable/detachable storage media such as a magnetic disk and an optical disk are inserted into the disk drive 1100. For example, a mouse 1110 and a keyboard 1120 are connected to the serial port interface 1050. For example, a display 1130 is connected to the video adapter 1060.

The hard disk drive 1031 stores therein, for example, an operating system (OS) 1091, an application program 1092, a program module 1093, and program data 1094. Each information described in the embodiment is stored in, for example, the hard disk drive 1031 and the memory 1010.

The detection program is stored in the hard disk drive 1031 as, for example, the program module 1093 that describes commands executed by the computer 1000. Specifically, the program module 1093 that describes each processing executed by the detection device 10 described in the embodiment is stored in the hard disk drive 1031.

Data used in information processing by the detection program is stored as the program data 1094 in, for example, the hard disk drive 1031. The CPU 1020 reads the program module 1093 and the program data 1094 stored in the hard disk drive 1031 into the RAM 1012 as needed, and executes each procedure described above.

The program module 1093 and the program data 1094 according to the detection program are not always stored in the hard disk drive 1031, and may be stored in, for example, an attachable/detachable storage medium and be read by the CPU 1020 via the disk drive 1100 and the like. The program module 1093 and the program data 1094 according to the detection program may be stored in the other computer connected via networks such as a local area network (LAN) and a wide area network (WAN), and be read by the CPU 1020 via the network interface 1070.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection device comprising a processing circuit, the processing circuit being configured to monitor a first communication event, wherein the first communication event is associated with a legitimate user accessing sensitive data, and wherein the first communication event includes an electronic communication between the legitimate user and another, wherein the first communication event creates data associated with the first communication event indicating legitimate access;

generate, based on a machine learning trained by using the data associated with the monitored first communication event including the electronic communication between the legitimate user and another user as training data, a profile of the legitimate user indicating normal behavior of the legitimate user when the legitimate user accesses the sensitive data, wherein the normal behavior includes at least one of: a legitimate access by the legitimate user accessing the sensitive data, an allowable method by the legitimate user accessing the sensitive data, or an allowable position of a computing device associated with the legitimate user in an computer network to access the sensitive data;

acquire a second communication event, wherein the second communication event includes an electronic communication between users including the legitimate user, and wherein the second communication event indicates the legitimate user accessing the sensitive data;

determine, based on the second communication event and the profile of the user, whether a behavior of the legitimate user according to the second communication event corresponds to the normal behavior;

dynamically update, based on the second communication event using the trained machine learning, the profile of the legitimate user; and output the determined whether the behavior of the legitimate user corresponds to the normal behavior, causing authentication of the legitimate user to access the sensitive data.

2. The detection device according to claim 1, wherein the communication by humans is an e-mail, a phone call, or communication by a message via a plurality of platforms from the user to the other user.

3. The detection device according to claim 1, wherein the processing circuit is configured to monitor, by monitoring a communication event by humans when a modification of permission conditions, a password, or an answer to a secret question is requested using an e-mail, a phone call, or a message via a plurality of platforms from the user to the other user, the communication event by humans.

4. The detection device according to claim 1, wherein the processing circuit is configured to build a profile of the user indicating normal behavior when the user accesses sensitive data using at least one of the access method of the user to the sensitive data, the kinds of sensitive data of an access destination of the user, and information on an access source position of the user to sensitive data.

5. The detection device according to claim 1, wherein the processing circuit is configured to determine, in a case where an access method indicated in a communication event when the user to be authenticated accesses sensitive data is different from an access method indicated in a profile of the user, that behavior of the user to be authenticated does not correspond to normal behavior when the user accesses the sensitive data.

6. The detection device according to claim 1, wherein the processing circuit is configured to build a profile of the user including kinds of sensitive data accessed by the user, and determine, in a case where the kinds of sensitive data indicated in a communication event when the user to be authenticated accesses the sensitive data is different from the kinds of sensitive data indicated in a profile of the user, that behavior of the user to be authenticated does not correspond to normal behavior when the user accesses the sensitive data.

7. The detection device according to claim 1, wherein the processing circuit is configured to build a profile of the user further including information on an access source position at which the user can access sensitive data, and determine, in a case where an access source position to sensitive data indicated in a communication event when the user to be authenticated accesses the sensitive data is different from an access source position indicated in a profile of the user, that behavior of the user to be authenticated does not correspond to normal behavior when the user accesses the sensitive data.

8. The detection device according to claim 1, wherein the processing circuit is further configured to output, in a case where behavior of the user to be authenticated does not correspond to normal behavior when the user accesses sensitive data, a warning to a manager.

9. A detection method executed by a detection device, the method comprising:

monitoring a first communication event, wherein the first communication event is associated with a legitimate user accessing sensitive data, and wherein the first communication event includes an electronic communication between the legitimate user and another, wherein the first communication event creates data associated with the first communication event indicating legitimate access;

generating, based on a machine learning trained by using the data associated with the monitored first communication event including the electronic communication between the legitimate user and another user as training data, a profile of the legitimate user indicating normal behavior of the legitimate user when the legitimate user accesses the sensitive data, wherein the normal behavior includes at least one of: a legitimate access by the legitimate user accessing the sensitive data, an allowable method for the legitimate user accessing the sensitive data, or an allowable position of a computing device associate with the legitimate user in a computer network to access the sensitive data;

acquiring a second communication event, wherein the second communication event includes an electronic communication between users including the legitimate user, and wherein the second communication event includes the legitimate user accessing the sensitive data;

determining, based on the second communication event and the profile of the user, whether a behavior of the legitimate user according to the second communication event corresponds to the normal behavior, dynamically update, based on the second communication event using the trained machine learning, the profile of the user; and outputting the determined whether the behavior of the user corresponds to the normal behavior, causing authentication of the user to access the sensitive data.

10. A detection program recorded in a non-transitory storage medium including programmed instructions, wherein the instructions, when executed by a computer, cause the computer to perform:

monitoring a first communication event, wherein the first communication event is associated with a legitimate user accessing sensitive data, and wherein the first communication event includes an electronic communication between the legitimate user and another, wherein the first communication event creates data associated with the first communication event indicating legitimate access;

generating, based on a machine learning trained by using the data associated with the monitored first communication event including the electronic communication between the legitimate user and another user as training data, a profile of the legitimate user indicating normal behavior of the legitimate user when the legitimate user accesses the sensitive data, wherein the normal behavior includes at least one of: a legitimate access by the legitimate user accessing the sensitive data, an allowable method by the legitimate user accessing the sensitive data, or an allowable position of a computing device associated with the legitimate user in a computer network to access the sensitive data;

acquiring a second communication event, wherein the second communication event includes an electronic communication between users including the legitimate user, and wherein the second communication event indicates the legitimate accessing the sensitive data;

determining, based on the second communication event and the profile of the user, whether a behavior of the legitimate user according to the second communication event corresponds to the normal behavior;

dynamically update, based on the second communication event using the trained machine learning, the profile of the legitimate user; and outputting the determined whether the behavior of the legitimate user corresponds to the normal behavior, causing authentication of the legitimate user to access the sensitive data.

* * * * *